United States Patent [19]

Morikawa

[11] Patent Number: 5,696,889
[45] Date of Patent: Dec. 9, 1997

[54] METHOD OF AND APPARATUS FOR GENERATING TONE REPRODUCTION CURVE FOR CONVERTING COLOR SIGNALS

[75] Inventor: Seiichiro Morikawa, Kanagawa-ken, Japan

[73] Assignee: Fuji Photo Film Co., Ltd., Kanagawa, Japan

[21] Appl. No.: 701,014

[22] Filed: Aug. 21, 1996

[30] Foreign Application Priority Data

Aug. 22, 1995 [JP] Japan ................... 7-213343

[51] Int. Cl.$^6$ .................................. H04N 1/50
[52] U.S. Cl. ..................... 395/109; 358/521; 358/534
[58] Field of Search .................... 395/109; 358/534, 358/521, 456, 458, 298, 518, 504, 529

[56] References Cited

U.S. PATENT DOCUMENTS

| | | | |
|---|---|---|---|
| 4,393,398 | 7/1983 | Horiguchi et al. | 358/504 |
| 4,472,736 | 9/1984 | Ushio et al. | 358/518 |
| 4,956,718 | 9/1990 | Numakura et al. | 358/456 |
| 5,072,305 | 12/1991 | Numakura et al. | 358/456 |

FOREIGN PATENT DOCUMENTS

| | | | |
|---|---|---|---|
| 4124666 | 4/1992 | Japan | G03F 3/08 |
| 4253472 | 9/1992 | Japan | H04N 1/40 |
| 4253474 | 9/1992 | Japan | H04N 1/40 |

*Primary Examiner*—Scott A. Rogers
*Attorney, Agent, or Firm*—Sughrue,Mion,Zinn,Macpeak & Seas, PLLC

[57] ABSTRACT

A basic gradation curve, a gray balance, and a black curve are selected, and a tone reproduction curve is generated based on a combination of the basic gradation curve, the gray balance, and the black curve which have been selected. Using the generated tone reproduction curve, a sample image is color-separated to generate a proof. The proof is checked, and, if necessary, the tone reproduction curve is corrected until an optimum tone reproduction curve is generated.

11 Claims, 8 Drawing Sheets

FIG.4A

HALFTONE DOT % VALUE

FIG.4B

M HALFTONE DOT % VALUE

FIG.4C

Y HALFTONE DOT % VALUE

FIG.6

| CURVE EDITOR |
|---|
| FILE  CURVE DISPLAY |

NAME OF CURVE

HL/SH SETTING:

| | DENSITY | Y% | M% | C% | K% |
|---|---|---|---|---|---|
| HL | | | | | |
| MD | | | | | |
| SH | | | | | |

◆ POSITIVE   ◇ NEGATIVE

BLACK CURVE START POINT ☐

REGISTER

REFERENCE CURVE
No. DENSITY Y% M% C% K%

REGISTERED CURVE
Y% M% C% K%

SET   ADD   DELETE   SMOOTHING

USER CURVE WINDOW

FILE

NAME OF CURVE: defaultcurve

HALFTONE % SETTING:
DENSITY  Y  M  C  K
HL
MD
SH

BLACK CURVE START POINT:

POSITIVE /NEGATIVE
◆ POSITIVE   ◇ NEGATIVE

SET DENSITY:
     Y  M  C
HL
SH

REGISTER

CORRECTIVE COEFFICIENT:
OVERALL  Y  M  C  K
HL
MD
SH

BOOST:
OVERALL  Y  M  C  K
HL
SH ns system used in the present invention;

METHOD OF AND APPARATUS FOR GENERATING TONE REPRODUCTION CURVE FOR CONVERTING COLOR SIGNALS

BACKGROUND OF THE INVENTION

1. Field of the Invention

The present invention relates to a method of and an apparatus for generating a tone reproduction curve for converting three color signals of cyan (C), magenta (M), and yellow (Y) which are produced when an original image is read, into four color signals of cyan (C), magenta (M), yellow (Y), and black (K) which are capable of reproducing desired color tones.

2. Description of the Related Art

In the art of printing and platemaking, there have widely been used image reading, recording, and reproducing systems for electrically processing image information read from original images to produce film plates in order to make printing and platemaking processes more efficient and improving the quality of images reproduced from such film plates.

In such an image reading, recording, and reproducing system, three color signals of C, M, Y produced by scanning an original image are converted into four color signals of C, M, Y, K which are capable of reproducing desired color tones, using a tone reproduction curve, and then film plates are generated on the basis of the respective four color signals. Image processing processes which are carried out upon conversion from the three color signals of C, M, Y into the four color signals of C, M, Y, K are disclosed in Japanese laid-open patent publications Nos. 4-124666, 4-253472, and 4-253474, for example.

The tone reproduction curve provides basic conditions for governing the tone reproducibility of original images on film plates. The tone reproduction curve is established as representing halftone dot % values of four color signals of C, M, Y, K that are outputted with respect to the density of a gray original image.

Heretofore, it has been customary to establish and register a tone reproduction curve by entering numerical values which represent the relationship between measured values of the density of an original image and halftone dot values to be reproduced on film plates. For achieving good tone reproducibility, it is necessary for the operator to enter numerical values in order to obtain smooth a tone reproduction curve. However, the operator needs to be highly skilled to select such numerical values for generating a smooth tone reproduction curve and takes a considerable period of time to enter the numerical values. If a large number of tone reproduction curves are to be established and registered for use with various types of originals, then the entire process results in a considerable expenditure of time and labor. The tone reproduction curve that has been established and registered can finally be determined after the actual tone reproducibility of a test image has been confirmed and accepted. If the tone reproducibility of a test image is not acceptable, then the operator has to establish and register a tone reproduction curve again.

SUMMARY OF THE INVENTION

It is a general object of the present invention to provide a method of and an apparatus for generating a tone reproduction curve for converting color signals in a manner to allow the operator to establish and register a tone reproduction curve easily and efficiently.

A major object of the present invention is to provide a method of and an apparatus for generating a tone reproduction curve for converting color signals easily and efficiently by correcting a preset tone reproduction curve.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
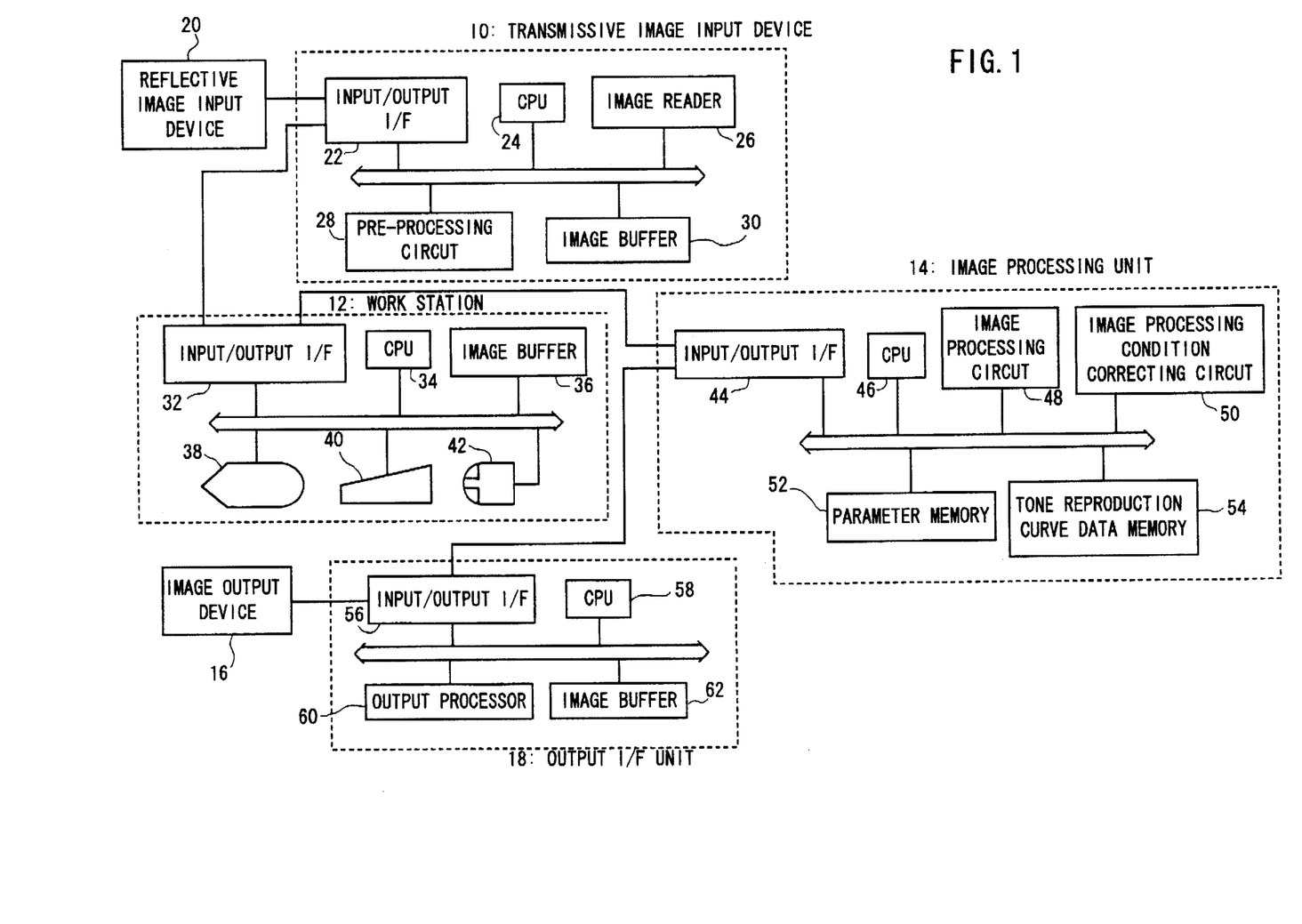
FIG. 1 is a block diagram of an image reading, recording, and reproducing system used in the present invention.

As shown in FIG. 1, an image reading, recording, and reproducing system used in the present invention generally comprises a transmissive image input device 10 comprising a scanner for reading an image recorded on a transmissive original, a work station 12 for controlling image processing operation on an interactive basis through a display unit, an image processing unit 14 for processing image data under the control of the work station 12, an image output device 16 for outputting film plates of C, M, Y, K based on the processed image data, and an output interface unit 18 for outputting an image signal from the image processing unit 14 to the image output device 16. A reflective image input device 20 comprising a scanner for reading an image recorded on a reflective original is connected, if necessary, to the transmissive image input device 10.

The transmissive image input device 10 has an input/output interface 22 for receiving an image signal from the reflective image input device 20 and transmitting an image signal processed in the transmissive image input device 10 to the work station 12, a central processing unit (CPU) 24, an image reader 26 for reading an image recorded on a transmissive original with a charge-coupled device (CCD)

or the like, a pre-processing circuit 28 for converting an image signal produced by the image reader 26 from a voltage signal into a current signal and logarithmically converting the current signal to produce color signals C, M, Y, and an image buffer 30 for temporarily storing the color signals from the pre-processing circuit 28.

The work station 12 comprises an input/output interface 32 for receiving color signals from the transmissive image input device 10 and transmitting color signals to the image processing unit 14, a CPU 34, an image buffer 36 for temporarily storing color signals, and a console including a display unit 38, a keyboard 40, and a mouse 42 for displaying images to control image processing operation.

The image processing unit 14 comprises an input/output interface 44 for transmitting signals to and receiving signals from the work station 12 and transmitting signals to and receiving signals from the output interface unit 18, a CPU 46, an image processing circuit 48 for effecting gradation, edge, scaling, and other image processing processes on color signals of C, M, Y to generate color signals of C, M, Y, K, an image processing condition correcting circuit 50 for correcting image processing conditions in the image processing circuit 48, a parameter memory 52 for storing parameters of the image processing conditions, and a tone reproduction curve data memory 54 for storing tone reproduction curve data used in the gradation process.

The output interface unit 18 comprises an input/output interface unit 56 for receiving color signals from the image processing unit 14 and transmitting color signals to the image output device 16, a CPU 58, an output processor 60 for outputting color signals to the image output device 16, and an image buffer 62 for temporarily storing color signals.

Figure 2:
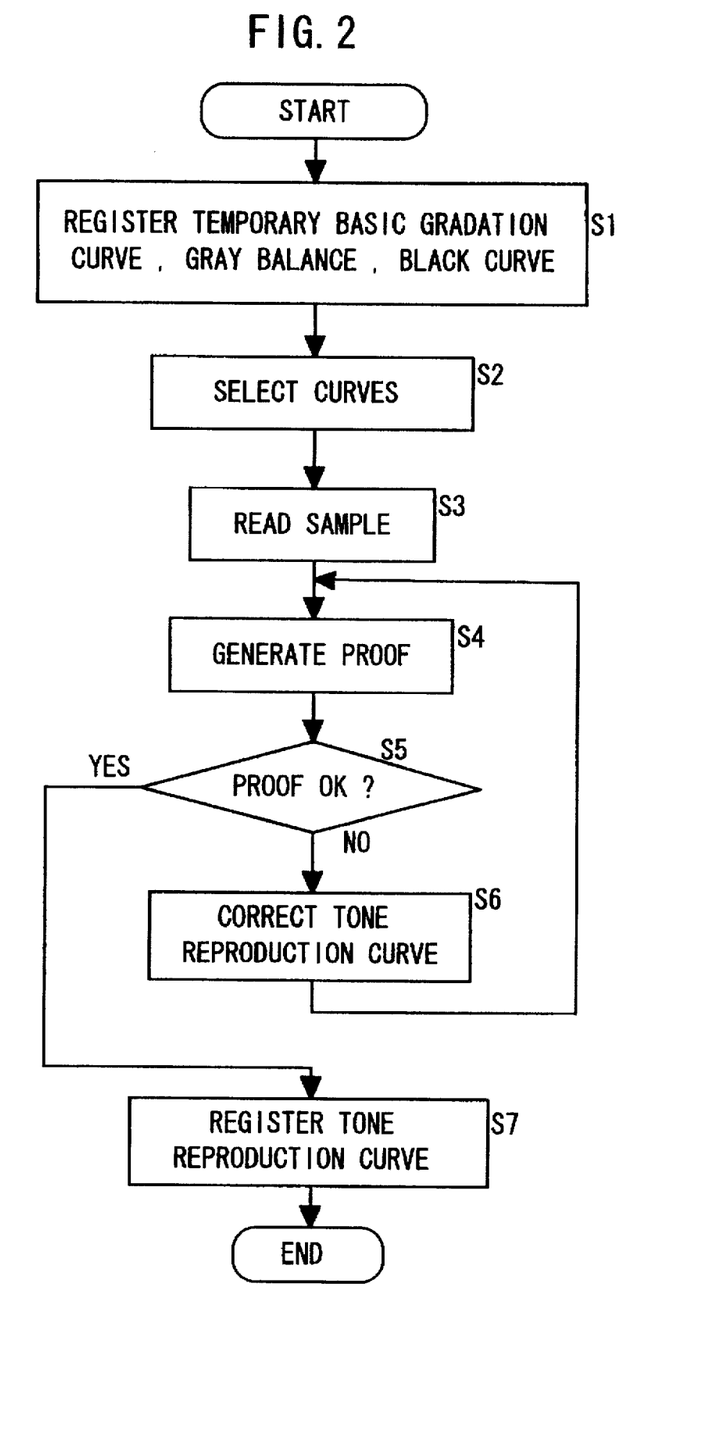
FIG. 2 is a flowchart of a method of generating a tone reproduction curve for converting color signals according to the present invention, which is carried out in the image reading, recording, and reproducing system shown in FIG. 1.

A method of generating a tone reproduction curve for converting color signals according to the present invention, which is carried out in the image reading, recording, and reproducing system shown in FIG. 1, will be described below with reference to FIG. 2.

Basic gradation curve, gray balance, and black curve data for making up provisional reference tone reproduction curves are registered in the tone reproduction curve data memory 54 in the image processing unit 14 in a step S1.

Figure 3:
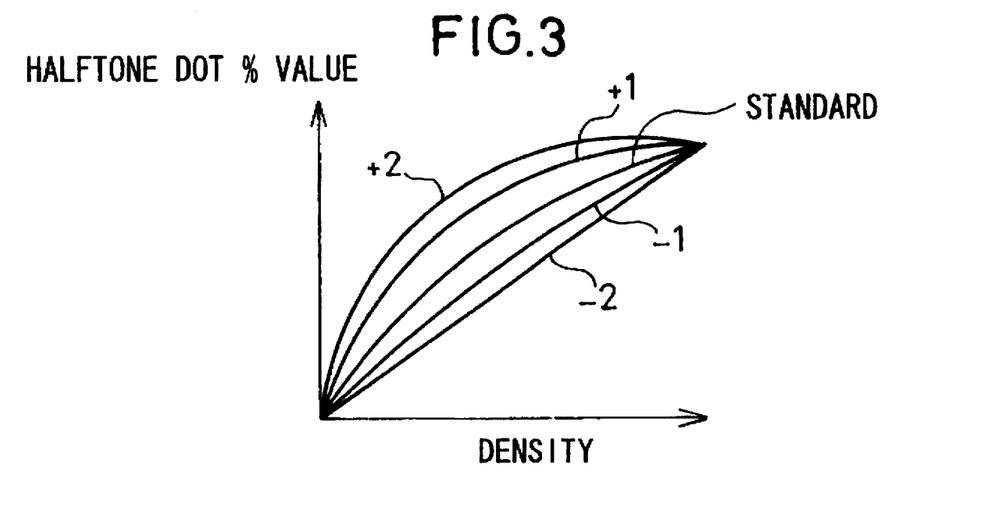
FIG. 3 is a diagram showing basic gradation curves.
Figure 8A:
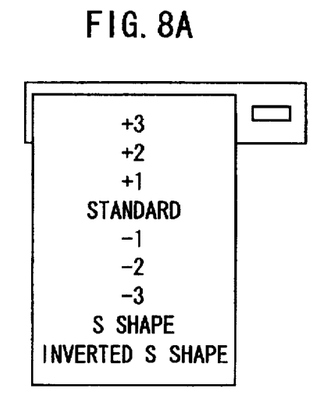
FIG. 8A is a diagram showing a pull-down menu for selecting basic gradation curve configurations.

A basic gradation curve serves to impart desired tone reproducibility with respect to a color signal of C, for example. The basic gradation curve represents halftone dot % values with respect to densities of C, as shown in FIG. 3. There are available a choice of different curve configurations: +3, +2, +1, standard, −1, −2, −3, S shape, and inverted S shape for the basic gradation curve (see FIG. 8A). The curve configurations: +3, +2, +1, standard, −1, −2, −3 represent respective directions and magnitudes of curve adjustment. For example, the curve configuration +2 represents a 10% upward shift in an intermediate density section from the curve configuration: standard. The curve configuration: S shape (inverted S shape) represents a combination of downwardly convex and upwardly convex shapes (a combination of upwardly convex and downwardly convex shapes) for the standard gradation curve.

Figure 4A:
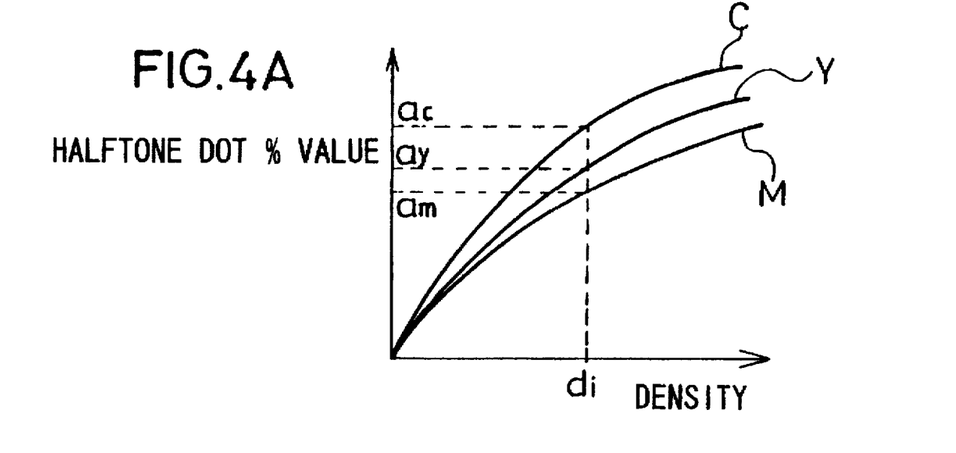
FIGS. 4A, 4B, and 4C are diagrams showing halftone dot % values of C, M, Y with respect to the density of an original image, halftone dot % values of M with respect to halftone dot % values of C, and halftone dot % values of Y with respect to halftone dot % values of C, respectively.
Figure 4B:
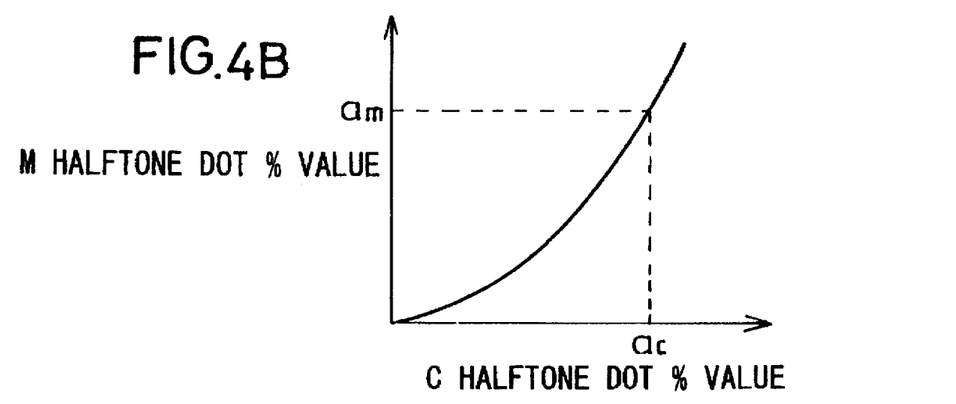
Figure 4C:
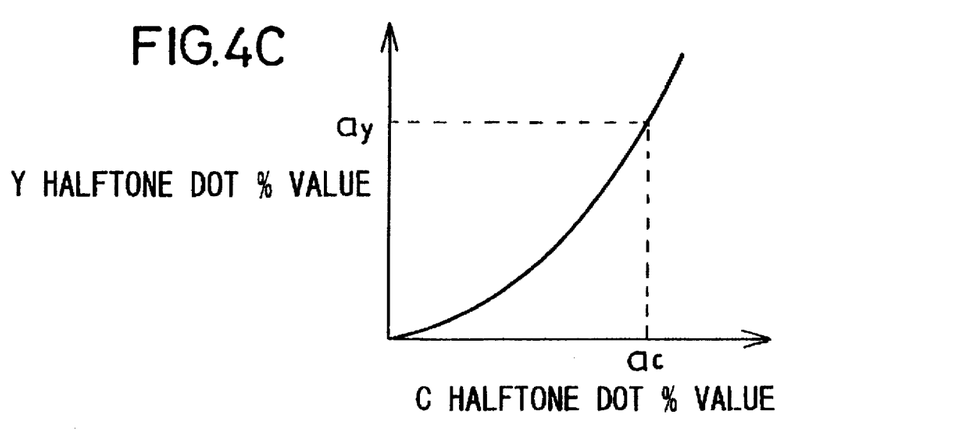
Figure 8B:
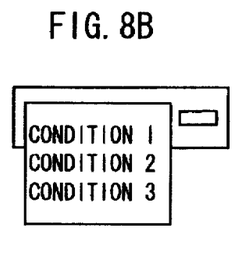
FIG. 8B is a diagram showing a pull-down menu for selecting gray balance curve configurations.

A gray balance is defined as representing halftone dot % values of M and Y for obtaining a gray with respect to a color signal of C having a given halftone dot % value. FIG. 4A shows the relationship between halftone dot % values of C, M, Y for giving a gray at the density of an original. For example, the gray balance is defined as halftone dot % values $a_m$, $a_y$ (%) of M and Y with respect to a halftone dot % value $a_c$ of C at the density $d_1$ of an original, as shown in FIGS. 4A through 4C. For the gray balance, there are available three curve configurations which can be selected by selecting corresponding conditions 1, 2, 3 (see FIG. 8B). The condition 1 represents halftone dot % values $a_c=a_m$, $a_c=a_y$, for example. The condition 3 represents downwardly convex curve configurations as shown in FIGS. 4B and 4C. Conversely, the condition 2 represents upwardly convex curve configurations.

Figure 8C:
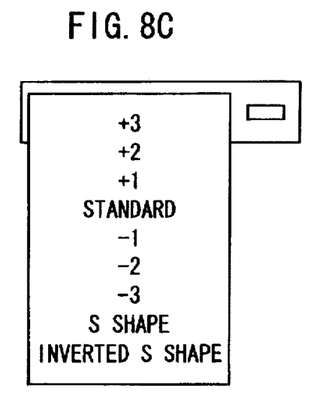
FIG. 8C is a diagram showing a pull-down menu for selecting black curve configurations.

A black curve is defined as representing the relationship between the halftone dot % value of K and the density of an original. As with the basic gradation curve, there are available a choice of different curve configurations: +3, +2, +1, standard, −1, −2, −3, S shape, and inverted S shape for the black curve (see FIG. 8C).

Figure 6:
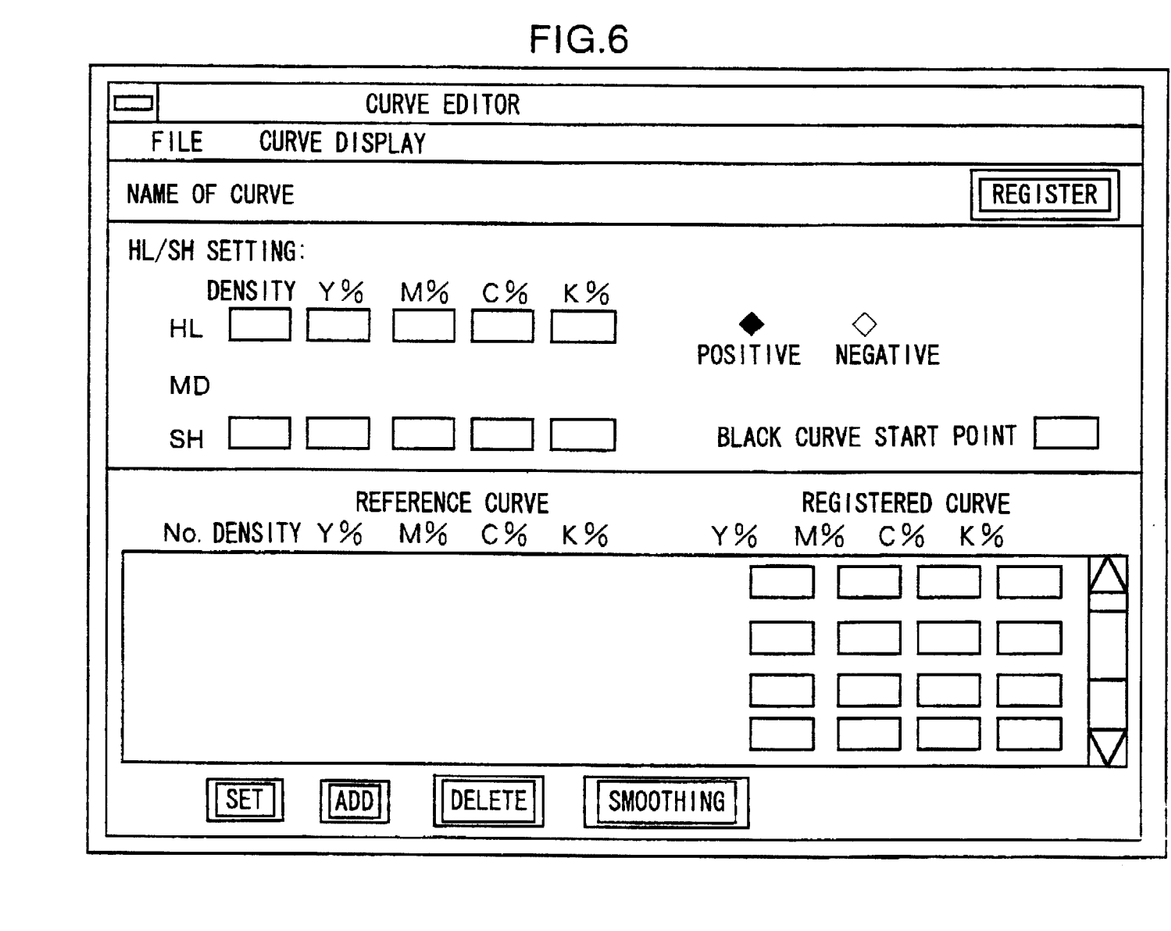
FIG. 6 is a diagram showing a displayed curve editor window.
Figure 7:
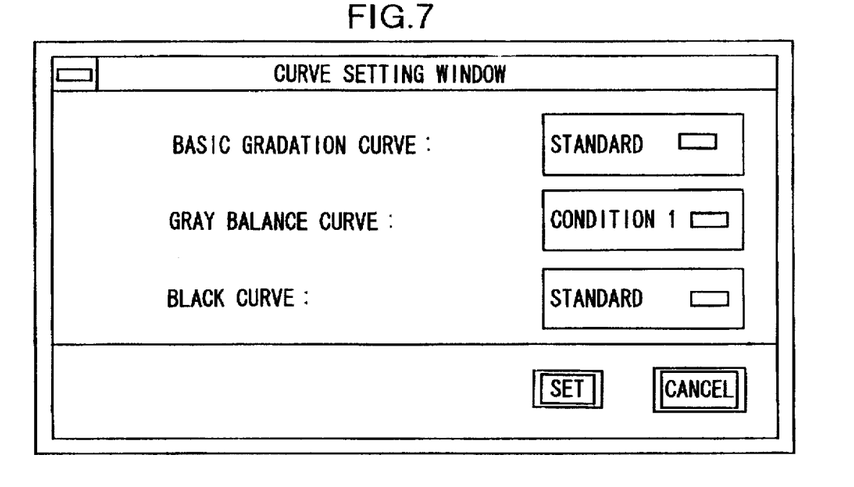
FIG. 7 is a diagram showing a displayed curve setting window.

After the step S1, the operator operates the keyboard 40 or the mouse 42 of the work station 12 to display a curve editor window shown in FIG. 6 on the display unit 38, and then select desired curves from the registered basic gradation curve, gray balance, and black curve data in a step S2. Specifically, the operator selects the generation of a "new file" in the curve editor window shown in FIG. 6, and displays a curve setting window shown in FIG. 7 on the display unit 38. Then, the operator selects a desired basic gradation curve configuration, a desired gray balance curve configuration, and a desired black curve configuration in the curve setting window. Specifically, the curve configuration of the desired basic gradation curve can be selected from the curve configurations: +3, +2, +1, standard, −1, −2, −3, S shape, and inverted S shape shown in FIG. 8A. The curve configuration of the desired gray balance can be selected, as halftone dot % values of M and Y with respect to a halftone dot % value of C, from the conditions 1, 2, 3 shown in FIG. 8B. The curve configuration of the desired black curve can be selected from the curve configurations: +3, +2, +1, standard, −1, −2, −3, S shape, and inverted S shape shown in FIG. 8C.

Figure 5:
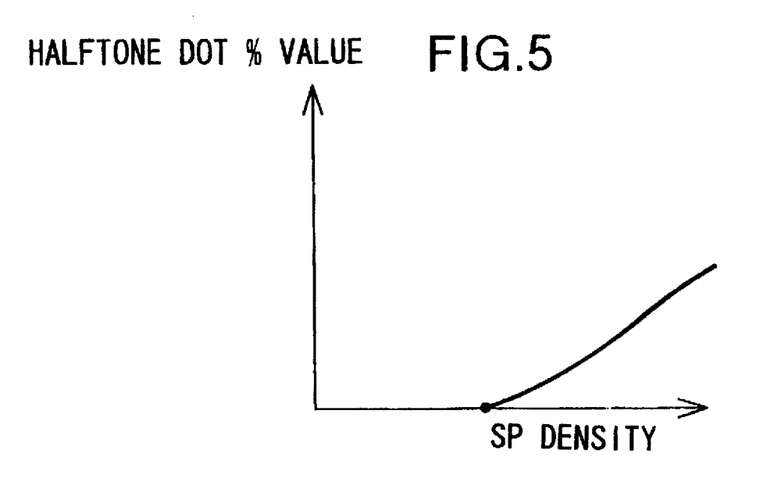
FIG. 5 is a diagram showing a black curve.

After the desired basic gradation curve configuration, the desired gray balance curve configuration, and the desired black curve configuration are selected on the respective menus, and desired density vs. halftone dot % values of highlights and shadows and the density of a start point SP (see FIG. 5) of the black curve are selected, a reference sample original such as a dye scale, a color chart, or the like is read from the transmissive image input device 10 or the reflective image input device 20 in a step S3. Then, in a step S4, a proof is generated using the curves selected in the step S2. An original density SMPLD(i) (i=1 n: n is the number of samples) is normalized using a highlight density UHLVD and a shadow density USHVD to produce a normalized original density SORGD(i) expressed by:

$$SORGD(i)=SMPLD(i) \cdot (USHVD-UHLVD) \quad (1)$$

Using the basic gradation curve selected in the step S2, the relationship between the normalized original density SORGD(i) and a halftone dot % value SDOTPC(i) relative to the color signal of C is determined by a predetermined interpolating function Fbc as follows:

$$SDOTPC(i)=Fbc(SORGD(i)) \quad (2)$$

Various interpolating functions may be used as the interpolating function Fbc. For example, interpolating functions for carrying out linear interpolation, quasi-Hermitian interpolation, spline interpolation, etc. may be used.

Then, using the gray balance selected in the step S2, halftone dot % values SDOTPY(i) and SDOTPM(i) relative to the color signals of Y and M are determined by predetermined interpolating functions Gcy, Gcm as follows:

$$SDOTPY(i)=Gcy(SDOTPC(i)) \qquad (3)$$

$$SDOTPM(i)=Gcm(SDOTPC(i)) \qquad (4)$$

Furthermore, using the black curve selected in the step S2, a halftone dot % value SDOTPK(i) relative to the color signal of K is determined by a predetermined interpolating function Fbk as follows:

$$SDOTPK(i)=Fbk(SDOTPC(i)) \qquad (5)$$

A tone reproduction curve is then generated from the halftone dot % values SDOTPC(i), SDOTPM(i), SDOTPY (i), SDOTPK(i) relative to the color signals of C, M, Y, K. The generated tone reproduction curve is sent to the image processing unit 14, which generates a proof of the sample original using the generated tone reproduction curve in the step S4. Specifically, the color signals of C, M, Y relative to the sample original are transferred from the transmissive image input device 10 or the reflective image input device 20 to the image processing unit 14, in which the color signals of C, M, Y are converted into halftone dot values of C, M, M, K according to the equations (1)~(5) by the image processing circuit 48. Thereafter, the halftone dot % values of C, M, M, K are transmitted from the image processing unit 14 through the output interface unit 18 to the image output device 16, which generates the proof.

The operator then visually compares the proof and the sample original to check the proof in a step S5. If the proof is desirable, then the operator accepts the tone reproduction curve which has been generated and register its data in the tone reproduction curve data memory 54 in a step S7.

In the step S4, the proof is generated and adjusted. However, if desirable halftone dot % values in a given region on the sample original are known, then the operator may not generate a proof, but enter the desirable halftone dot % values directly in the curve editor window shown in FIG. 6 and adjust the proof.

Figure 9:
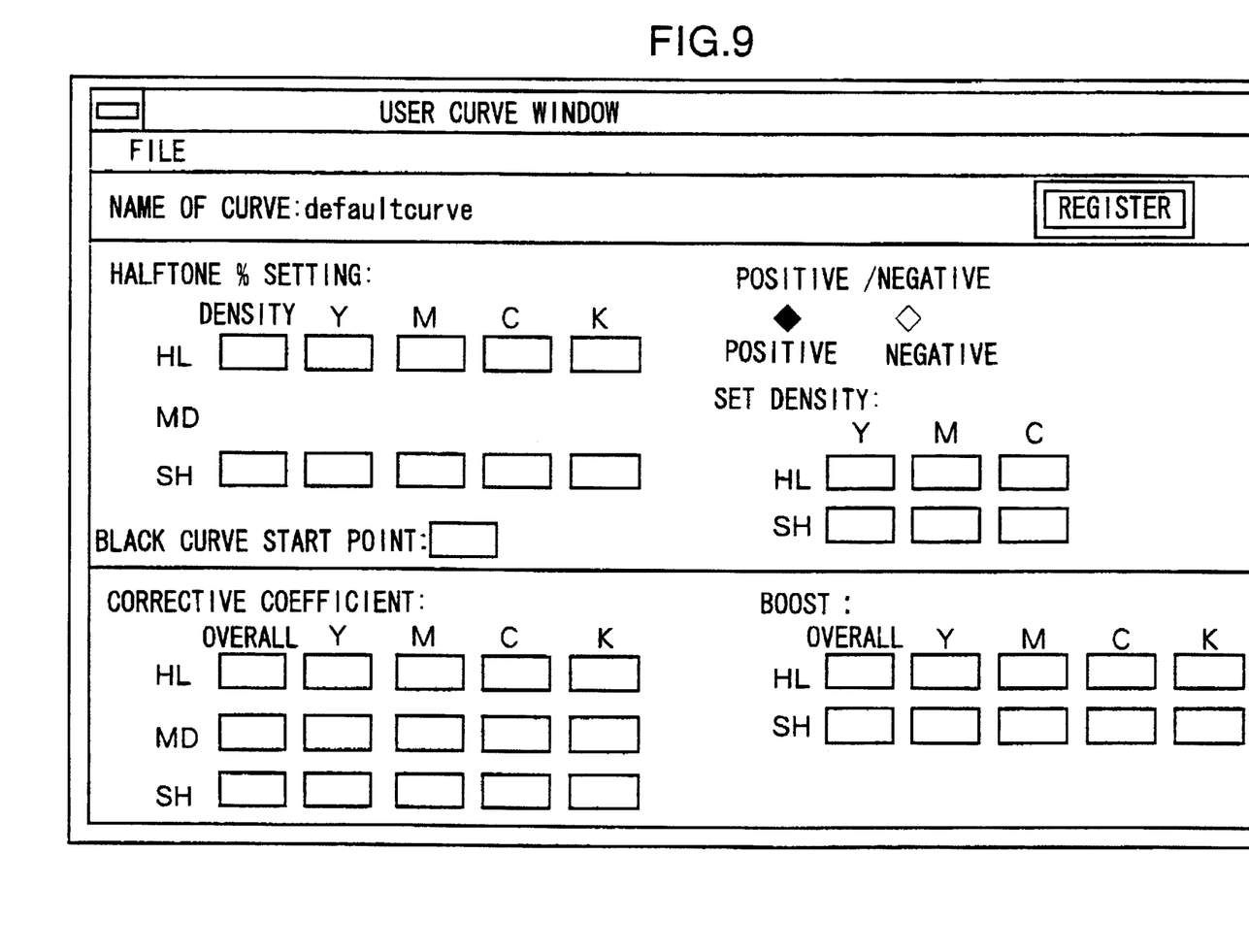
FIG. 9 is a diagram showing a displayed user curve window.

If the proof is not desirable in the step S5, then the operator corrects the tone reproduction curve in a step S6. In the step S6, the operator displays a user curve window shown in FIG. 9 on the display unit 38, and corrects the tone reproduction curve in the user curve window. The operator repeats the steps S4~S6 to generate a desired tone reproduction curve, and register its data in the tone reproduction curve data memory 54 in the step S7. Alternatively, the operator corrects the registered halftone dot % values with respect to the density of the original in the curve editor window, and registers the corrected data in the tone reproduction curve data memory 54 in the step S7.

The operator may generate and register as many tone reproduction curves as the number of types of available sample originals, and select and use a desired one of the registered tone reproduction curves.

According to the present invention, as described above, a tone reproduction curve is generated by selecting and combining the basic gradation curve, gray balance, and black curve data which have been registered in advance, and a proof is generated based on a sample image using the generated tone reproduction curve. Based on the generated proof, the tone reproduction curve may be corrected and registered. Therefore, the operator can establish and register a tone reproduction curve easily and efficiently.

Although a certain preferred embodiment of the present invention has been shown and described in detail, it should be understood that various changes and modifications may be made therein without departing from the scope of the appended claims.

What is claimed is:

1. A method of generating a tone reproduction curve for converting color signals produced from an original image into halftone dot % signals of C, M, Y, K, comprising the steps of:

(a) selecting a basic gradation curve, a gray balance, and a black curve;

(b) generating a first tone reproduction curve based on a combination of the basic gradation curve, the gray balance, and the black curve which have been selected, and registering the generated first tone reproduction curve;

(c) adjusting said first tone reproduction curve such that halftone dot % signals of C, M, Y, K produced by converting a sample image using said first tone reproduction curve will become desired halftone dot % signals of C, M, Y, K, thereby producing a second tone reproduction curve; and (d) registering said second tone reproduction curve.

2. A method according to claim 1, wherein said step (a) comprises the step of selecting a basic gradation curve, a gray balance, and a black curve on menus in a displayed window.

3. A method according to claim 1, wherein there are available a choice of curve configurations for each of the basic gradation curve, the gray balance, and the black curve.

4. A method according to claim 3, wherein said curve configurations include a standard curve configuration and a plurality of curve configurations representing respective different directions and magnitudes of adjustment from said standard curve configuration.

5. A method according to claim 1, wherein said step (b) comprises the step of selecting the density vs. halftone dot % values of highlights and shadows and the density of a start point of the black curve.

6. A method according to claim 1, further comprising the step of interpolating said first tone reproduction curve according to a predetermined interpolating function.

7. A method according to claim 1, wherein said sample image comprises a reference sample image representing a dye scale or a color chart.

8. A method according to claim 1, wherein said first tone reproduction curve is prepared in advance depending on said sample image.

9. A method according to claim 1, wherein said step (c) comprises the steps of:

outputting a proof image based on said halftone dot % signals of C, M, Y, K produced by converting the sample image using said first tone reproduction curve; and comparing said proof image with said sample image to determine adjusting conditions for said first tone reproduction curve.

10. An apparatus for generating a tone reproduction curve for converting color signals produced from an original image into halftone dot % signals of C, M, Y, K, comprising:

a curve data memory for storing curve data of a basic gradation curve, a gray balance, and a black curve;

a selector for selecting said curve data;

a tone reproduction curve generator for generating a tone reproduction curve from the selected curve data;

an image reader for reading a sample image;

an image processor for processing said sample image read by said image reader using said tone reproduction curve;

an output device for outputting the sample image processed by said image processor; and a corrector for correcting said tone reproduction curve based on the outputted sample image.

11. An apparatus according to claim 10, wherein said selector includes a display unit.

* * * * *